Feb. 6, 1951

H. J. MUMMA 2,540,751

EGG TOTALIZER

Filed May 6, 1948

HAROLD J. MUMMA
INVENTOR.

BY
ATTORNEY

Feb. 6, 1951  H. J. MUMMA  2,540,751
EGG TOTALIZER
Filed May 6, 1948  3 Sheets-Sheet 2
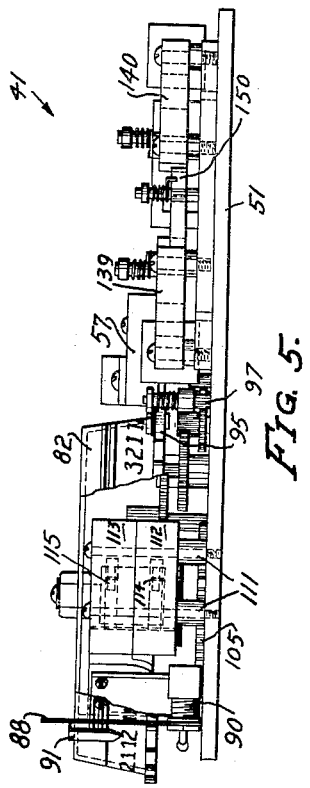
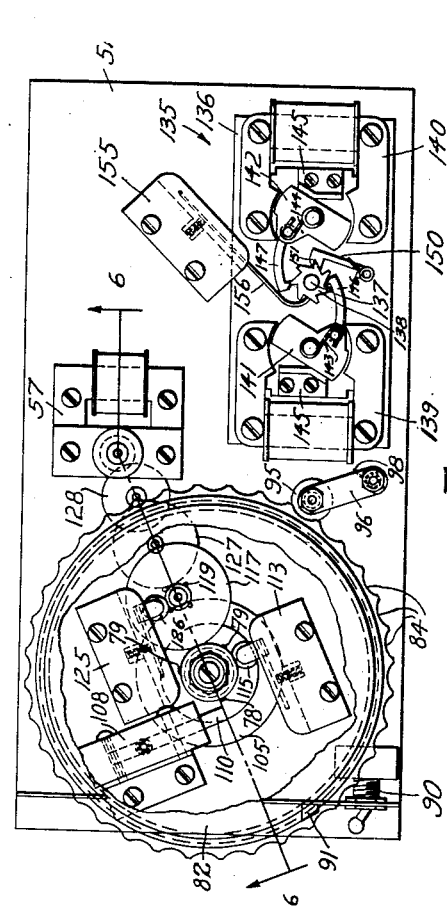
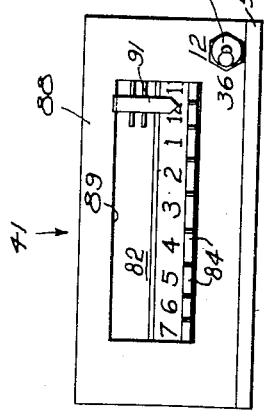
HAROLD J. MUMMA
INVENTOR.
BY 
ATTORNEY

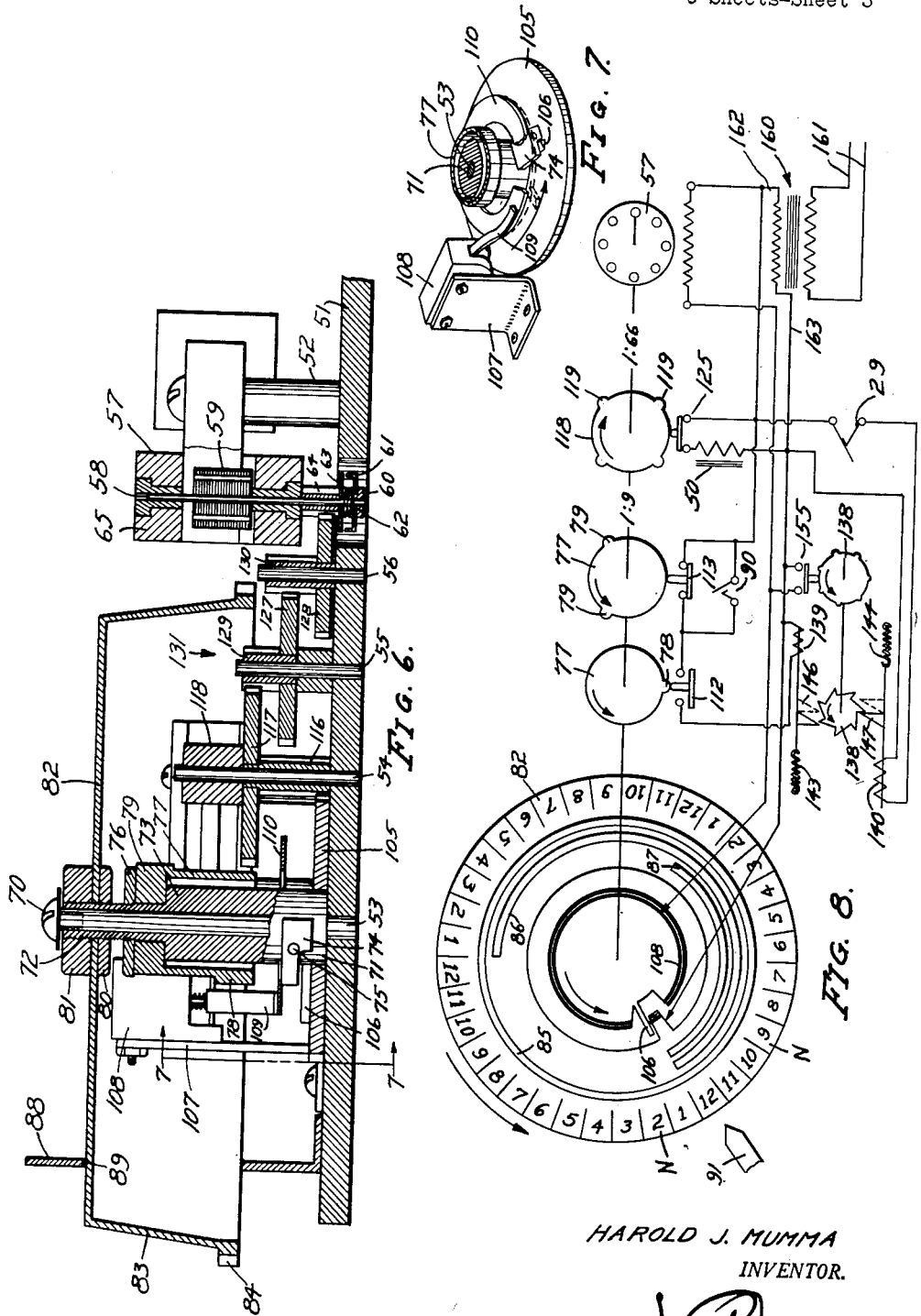

Patented Feb. 6, 1951

2,540,751

UNITED STATES PATENT OFFICE 2,540,751

EGG TOTALIZER

Harold J. Mumma, Riverside, Calif., assignor to Food Machinery and Chemical Corporation, a corporation of Delaware Application May 6, 1948, Serial No. 25,351

14 Claims. (Cl. 235—98)

This invention relates to totalizing devices and is especially useful in the packing of eggs.

It has been found advantageous, in packing eggs for the retail market, to entrust the packer with the function of performing a final segregation of the eggs after these have been sized and at the time she is handling the eggs incidental to placing them in cartons. Counting the eggs as they are sized fails to take into account this final segregation and thus fails to afford a correct basis for compensating the farmer for the eggs in each lot purchased from him.

It is an object of this invention to provide an egg totalizer which totalizes all the eggs in each of the various grades contained in a particular lot and which does this as they are being packed.

It is another object of this invention to provide an egg totalizer which totalizes the eggs packed in each grade from a given lot by automatically responding to the delivery of each packed carton of said grade to a conveyor belt and to the setting of said totalizer to indicate the number of eggs amounting to less than a full carton which are packed from said lot in said grade at the completion of the packing of the eggs from said lot.

It is still another object of this invention to provide an egg totalizer which totalizes the eggs actually packed from a given lot in each of the various grades and which requires a relatively small amount of attention from the packer in order for this totalizer to accurately perform its functions.

The manner of accomplishing the foregoing objects as well as further objects and advantages will be made manifest in the following description taken in connection with the accompanying drawings in which:

Fig. 3 is an enlarged front elevational view of one of the totalizer units of the invention shown in Fig. 1.

Fig. 4 is a plan view of the mechanism of said totalizer unit with the cover thereof removed and with the central portion of the selector bell broken away to show the elements of the mechanism normally enclosed thereby.

Fig. 5 is a side elevational view of Fig. 4 with a portion of said bell also broken away for the same reason.

Fig. 6 is an enlarged sectional view taken on the line 6—6 of Fig. 4.

Fig. 7 is a diagrammatic perspective view of the part carton counter switch.

Fig. 8 is a diagrammatic view illustrating the mechanism and wiring system of one of said units.

Figures 1, 2:
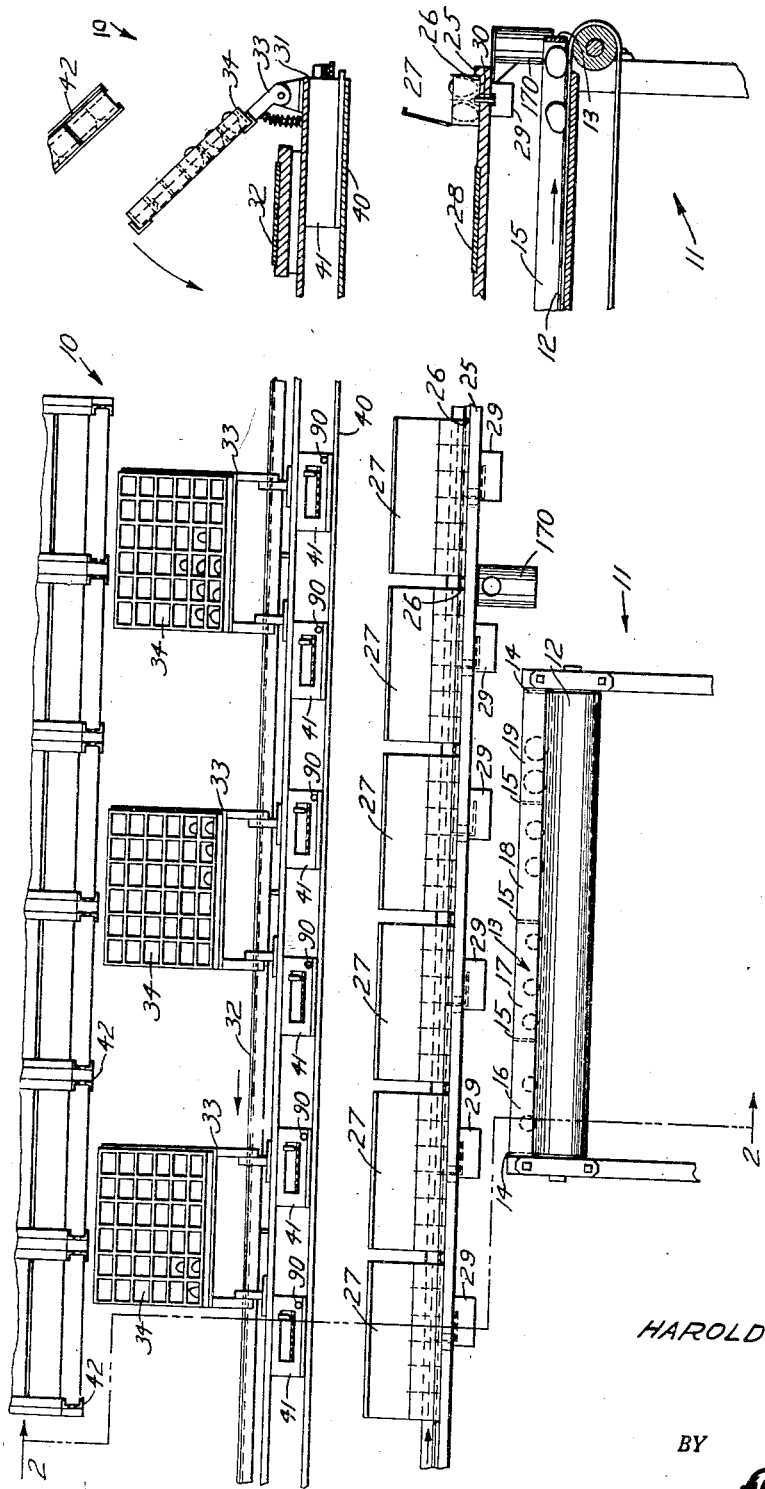
Fig. 1 is a diagrammatic front elevational view of the station for a single operator in an egg packing apparatus incorporating a preferred embodiment of the invention.
Fig. 2 is a diagrammatic vertical sectional view taken on the line 2—2 of Fig. 1.

Referring specifically to the drawings, Fig. 1 shows a packing apparatus 10 which includes a loose-egg conveyor 11 having an endless belt 12, the upper run of which constantly moves at a slow rate of speed towards a front wall 13, the conveyor 11 having side walls 14 and longitudinal division boards 15 which divides the space above the belt 12 into four lanes 16, 17, 18 and 19.

Eggs delivered to the belt 12 are pre-sized into small, medium, large and jumbo sizes and the eggs in each of these sizes are delivered to one of these lanes.

Immediately above the loose egg conveyor 11 is a packing table 25 on which a number of recesses 26 are provided for receiving six empty egg cartons 27.

Carried on the table 25, passing directly behind the cartons 27, is a packed carton conveyor belt 28. Provided on the table 25, beneath each of the recesses 26, is a normally closed primary control starting switch 29 having an actuating arm 30 which normally extends upwardly into the cavity in the bottom of the carton 27 resting in said recess so that when said carton has been filled and is shifted rearwardly onto the belt 28, the arm 30 is depressed and the switch 29 is momentarily opened.

Spaced above the packing table 25 is an undergrade table 31 on which a conveyor belt 32 travels lengthwise, the table 31 having racks 33 for supporting flats 34, each of which is adapted to receive three dozen undergrade eggs. The conveyor 32 is for carrying away the flats 34 when these have been filled.

Disposed between the tables 25 and 31 is a totalizer table 40 on which is mounted a series of totalizer units 41, one of these units being disposed directly above each of the recesses 26 on the table 25.

Supported overhead by a structure (not shown) is a series of empty carton dispensers 42, one of which is located directly over each of the recesses 26 and is kept constantly filled with empty cartons properly marked for receiving the grade of eggs being packed in cartons occupying that particular recess.

Each totalizer unit 41 is provided for the purpose of actuating a counter 50 during the packing of each individual lot of eggs so that at the end of the packing of this lot, this counter will indicate the number of eggs of that particular grade with the packing of which that totalizer is associated.

In practice, the counters 50 of all the totalizers 41 are at a remote centralized point and these counters are preferably of the printing type so that a print may be taken from these indicating the totals of eggs of each of the various grades packed from said lot, these totals being the basis for determining the purchase price to be paid the farmer for this lot of eggs.

Each totalizer unit 41 is mounted on a base having a motor standard 52 as well as shafts 53, 54, 55 and 56 fixed thereon and extending upwardly therefrom. Mounted on the standard 52 is an electric motor 57 having a shaft 58 carrying an armature 59 and having mounted on its lower end a clutch member 60 including a clutch member 61 which is fixed to the shaft, a spring 62 and a clutch member 63 which is fixed upon a pinion gear 64 which is freely rotatable on the shaft 58.

When the motor 57 is de-energized, the armature 59 drops into its lower position as shown in Fig. 6, thus disengaging the clutch 60. When the motor 57 is started, however, the armature 59 is lifted upwardly into centralized relation with the motor's field magnet 65 thereby engaging the clutch 60 and rotating the pinion 64.

Held in place on the shaft 53 by a screw 70 is a mandrel or secondary control rotor 71 having a threaded neck 72 at its upper end, the juncture of this neck with the mandrel providing a shoulder 73. The mandrel 71 has a dog 74 pivotally screwed thereon by a pin 75.

Supported on the shoulder 73 and held in place by a nut 76 is a cam sleeve 77 having a single cam 78 at a lower level and two cams 79 at a higher level.

To illustrate the operation of these cams, the cam 78 is illustrated in Fig. 8 as upon a separate element than the cams 79 but this is merely to clarify their distinctive operation as all three of these cams are formed upon the sleeve 77.

In Fig. 6 the cam 78 and one of the cams 79 are shown as if located 180° apart. This is only a diagrammatic representation of these cams, however, for the purpose of showing their vertical spacing in the sectional view of Fig. 6. In reality the cams 79 are spaced apart an angle of 120° and the cam 78 is spaced the same angle from each of the cams 79.

Rigidly fixed on the mandrel neck 72 by nuts 80 and 81 is an odd count selector 82. This has a shape of a bell, the outer wall 83 of which is divided into thirty-six parts and carries three series of numerals N from 1 to 12. The lower edge of the wall 83 is scalloped by the formation therein of a series of thirty-six depressions 84, the purpose of which will be made clear hereinafter.

In addition to carrying the numerals N, the wall 83 is provided with a first dozens line 85 which extends entirely around the wall 83; a second dozens line 86 which extends only two-thirds of the way around this wall; and a third dozens line 87 which extends only one-third of the way around this wall.

The cover for the unit 41 has a front wall 88 having a window 89 therein through which a portion of the selector 82 extends. Supported on the front wall 88 is a manual switch 90, its opened position being designated by the numeral 12 and its closed position being designated by the numeral 36, these numerals being applied to the wall 88 as shown in Fig. 3.

A pointer 91 depends from the upper edge of the window 89 pointing to one of the numerals N. A detent roller 95 mounted on an arm 96, rotatable on the upper end of a post 97, is urged by a spring 98 into successive depressions 84 in the rim of the wall 83 so as to cause the selector 82 to halt with the pointer 91 pointing at a particular one of the numerals N.

Rotatable about the mandrel 71, and resting on the base 51, is a gear 105 which has fixed thereon a triangular lug 106.

Supported on a bracket 107 and mounted on the base 51 is a secondary control switch 108, the switch arm 109 of which carries a ring 110, the latter surrounding the mandrel 71 and resting on the dog 74. When the ring 110 thus rests, as shown in Fig. 6, the switch 108 is closed. When the gear 105 is rotated, however, to bring the lug 106 into engagement with the dog 74, the latter is tilted, as shown in Fig. 7, thereby lifting the ring 110 and opening switch 108.

Also mounted on the base 51 on a pair of posts 111 are switches 112 and 113. The actuating rollers 114 and 115 of these switches bear constantly against the outer surface of the sleeve 77, the roller 114 lying in the path of the cam 78 and the roller 115 lying in the path of the cams 79.

The switches 112 and 113 are normally closed. The cams 78 and 79 are located at circumferential intervals of 120° apart and whenever one of these cams engages the roller disposed opposite it, the switch having that roller is opened.

Rotatable on the shaft 54 is a pinion 116 which meshes with the gear 105 and has formed integral therewith a gear 117 and a cam hub or rotary counter actuator 118 having four cams 119 extending radially therefrom.

Fixed on the base 51 is a counter switch 125, the actuating roller 126 of which is yieldably pressed against the cam hub 118. This switch is normally opened but is closed each time the roller 126 passes over one of the cams 119.

Rotatably mounted on the shafts 55 and 56 are gears 127 and 128 which are respectively integral with the pinions 129 and 130, the pinion 129 meshes with the gear 117, the pinion 130 meshes with the gear 127 and the gear 127 meshes with the motor pinion 64. A gear train is thus formed which connects the motor 57 with the gear 105 whenever this motor is energized.

As indicated in Fig. 8, there is a ratio of 1 to 9 between gear 105 and gear 117. While any suitable ratio may be provided by the gear train 131 between the gear 117 and the motor 57, a suitable ratio has been found to be 1:66.

Also mounted on the base 51 is a motor control impulse relay 135. This includes a mounting plate 136 which is secured to the base 51 and on which is fixed a vertical shaft 137. Freely rotatable on this shaft is a seven-tooth ratchet wheel 138. Mounted on the plate 136 on opposite sides of the shaft 137 are solenoids 139 and 140. These solenoids have armatures 141 and 142 and springs 143 and 144 which hold these armatures against stops 145 when the solenoids 139 and 140 are de-energized.

The armatures 141 and 142 carry dogs 146 and 147 which idle over the teeth of the ratchet wheel 138 when the solenoids 139 and 140 are energized but which engage the teeth of the ratchet wheel and turn the latter when the solenoids are de-energized and the armatures 141 and 142 are returned against the stops 145 by the springs 143 and 144.

Also mounted on the plate 136 is a spring actuated detent 150 which either rests within one of the notches between adjacent teeth of the ratchet wheel 138 or comes to rest with one of said teeth entering a notch 151 provided in the end of the detent 150. The purpose of the detent is to prevent rotation of the ratchet wheel 138 in a counter-clockwise direction.

Mounted on the base 51 is a motor control switch 155 which is normally open and has an actuating arm 156 which normally extends into one of the notches of the ratchet wheel 138.

As the motor 57 is preferably run by a 28-volt circuit, a transformer 160 is shown in Fig. 8 as receiving current from 110 v. leads 161. Secondary leads 162 and 163 from this transformer supply 28-volt current to the unit 41.

The lead 162 connects to one side of each of the following elements: switch 29, motor 57, switch 90, switch 113 and switch 125. The lead 163 connects to one side of the following elements: counter 50, switch 108, solenoid 139, solenoid 140 and switch 155.

The other side of switch 125 is connected to counter 50; the other sides of switches 90 and 113 are connected to one side of switch 112; and the other side of switch 112 is connected to the other side of solenoid 139.

The other side of switch 29 is connected to the other side of solenoid 140.

The other side of switch 108 is connected to the other side of switch 155 and to the other side of motor 57.

It is thus seen that the motor circuit may be closed either by switch 108 or by switch 155 and that both of these switches must be open to stop the motor.

Attention is called to the fact that in the diagrammatic view of Fig. 8, certain distortions of the apparatus occur for the purpose of presenting a simplified showing of the functions thereof. For instance, the cam 78 is shown as on a separate element 77 from the cams 79 while these are actually all on the cam sleeve 77 and formed integral therewith.

The switch 155 is also shown diagrammatically in association with a separate actuating cam, whereas it is actually actuated, as shown in Fig. 4, by the switch arm 156 riding on the periphery of the same ratchet wheel 138 which is engaged by the dogs 146 and 147 and the detent arm 150.

A further distortion in Fig. 8 may be seen in the representation adopted therein for the switch 108 in which this switch is shown as a wiping type switch instead of a swinging arm type switch as clearly disclosed in Figs. 6 and 7.

Operation

The counters 50, which are shown diagrammatically and in Fig. 8 only, are centralized in a counter cabinet (not shown) and are provided with printing faces from which an impression may be made on a lot record card at the end of the packing of each lot handled by the apparatus 10 so as to show the exact number of eggs taken from said lot and packed in each of the stations 26.

While only four sizes of eggs are delivered on the conveyor 11, the packer is required to candle the eggs before a candling light 170 mounted on the packing table 25 and make two additional segregations based on quality thus disclosed so that there are six distinctive sizes and grades packed on this apparatus.

The operation of each unit 41 and its counter 50, however, is the same for each of these packing stations and a description of the operation of one of these units will suffice for all.

Assuming that the cartons 27 are standard "dozen" cartons, the unit 41 for any given packing station is caused to actuate its counter 50 twelve times when a packed carton is moved from that station rearwardly onto the packed carton conveyor 28. The unit 41 performs this function in response to the momentary opening of the switch 29 of that unit as the filled carton 27 is moved thereover. An empty carton is then withdrawn from a supply chute directly above this station and placed over switch 29 in that station.

When this second carton has been filled, it is pushed rearwardly on the conveyor 28 in the same manner as the first, with the result that actuation of the switch 29 causes the unit 41 for this station to again actuate the counter 50 thereof twelve times.

This continues throughout the packing of the particular lot of eggs being handled by the apparatus. At the conclusion of the packing of this lot, a lot card arrives on the conveyor 11 with the name on it of the farmer from whom this particular lot of eggs had been purchased.

The operator thereupon actuates each of the units 41 so that these units will actuate their respective counters 50 to add to the totals shown by these counters the number of eggs contained respectively in the six incompletely packed cartons in the various packing stations 26.

When this has been done, the operator inserts the lot card into position to receive an imprint simultaneously from all of the counters 50 showing the total number of eggs packed from this particular lot in each of the stations 26.

This having been done, the counters 50 are set back to zero and the operator is ready to start packing on a new lot of eggs which now starts to arrive on the conveyor 11.

The first part of this new lot of eggs is used to fill up the cartons 27 which were incompletely filled at the close of the packing of the last previous lot. It is one of the advantages of the present invention that as the packing of each of these partially filled cartons 27 is completed and it is pushed backwardly onto the conveyor 28 so as to trip the switch 29 therebeneath, the totalizing unit 41 for that packing station automatically actuates the counter 50 associated therewith a number of times equal to the number of eggs which were added to this carton from the new lot, the packing of which has just been started, in order to complete the packing of that carton. When the next succeeding carton packed in this particular station, however, has been filled entirely from this new lot and is pushed rearwardly so as to actuate its switch 29, the unit 41 for this station automatcally actuates its counter twelve times.

It is thus apparent that the only attention which the operator must pay to the units 41 to cause them to accurately totalize all the eggs packed from each lot in the stations respectively associated with said units, is in setting these units to add to their respective counters the number of eggs respectively contained in the partially filled cartons remaining at the end of the packing of a given lot.

The manner in which any one of these totalizer units 41 accomplishes these functions is as follows:

Assuming that dozen cartons are to be employed in packing eggs in the apparatus 10, the switches 90 of all the units 41 are turned to twelve at the beginning of the packing day and the pointer 91 of each of these units points to one of the numerals 12 on the selector 82 thereof.

At this time, in each of the units 41, the lug 106 is pressed against the dog 74 so as to cock this upwardly as shown in Fig. 7 thereby opening the switch 108 and assuring that any anti-clockwise rotary motion of the gear 105 will be transmitted to the mandrel 71 and the cam sleeve 77.

When the operator has completed packing a carton at the station for the particular unit 41, the operation of which is being described, she pushes this rearwardly onto the packed carton conveyor belt 28 thereby tripping the arm 30 and momentarily opening the switch 29.

As the solenoid 140 is constantly energized, excepting when the switch 29 is thus tripped, the dog 147 is ordinarily in its position of readiness (shown in full lines in Fig. 8) so that when the solenoid 140 is thus momentarily deenergized, the spring 144 pulls the dog 147 into its dotted line position in this view, thereby rotating the ratchet wheel 138 one-fourteenth of a revolution.

This brings one of the teeth of the ratchet wheel directly under the tip of the arm 156 of the switch 155 thereby closing this switch and starting the motor 57.

The rising of the armature 59 of the motor 57 as it is energized, closes the clutch 60 and starts the gear train 131 in motion. This turns the cam hub 118 and as each of the cams 119 comes opposite the roller 126 of the switch 125, it closes this switch causing a single actuation of the counter 50.

The gear 105 is also rotated by the gear train at a ratio of once for each nine revolutions of the cam hub 118. This rotates the mandrel 71, the cam sleeve 77, and the selector 82 one-third of a revolution or 120° while the switch 125 is being actuated twelve times.

The detent roller 95 rides from one depression 84 to the next as this actuation of the counter takes place. One of the cams 78 or 79 comes opposite the rollers 114 or 115 respectively of the switches 112 or 113 just as the counter 50 has been given its twelfth actuation so that either the switch 112 or the switch 113 is opened. As both of these switches have been closed during the rotation of the cam sleeve 77 incidental to these twelve actuations being imparted to the counter 50, the solenoid 139, during this period, is energized to retract the dog 146 into the dotted line position in which it is shown in Fig. 8. This brings this dog closely behind one of the teeth of the ratchet wheel 138 and when the solenoid 139 is de-energized by the opening of one of the switches 112 or 113 as hereinabove noted, the spring 143 operates to pull the dog 146 against this tooth of the ratchet wheel 138 so as to impart to the latter another one-fourteenth of a revolution. This brings one of the valleys between adjacent teeth of the ratchet wheel 138 opposite the extremity of the arm 156 of the switch 155, as shown in Fig. 4, so as to open this switch thereby de-energizing the motor 57.

Immediately upon this happening, the armature 59 drops by gravity to the position in which it is shown in Fig. 6, thereby opening the clutch 60 and halting movement of the gear train 131. The lodging of the detent roller 95 in the depression 84 into which it rides as this takes place, indexes the gear train 131 and the selector 82 with the pointer 91 again pointing at one of the numerals N with a value of twelve.

The operation of the unit 41, as just described, is repeated to add a value of twelve to the counter thereof by each subsequent operation of the switch 29 incidental to moving a fully packed carton rearwardly from its station 26 onto the packed carton conveyor 28.

When all the eggs from the lot being handled are packed and the carton in the station 26 for the unit 41 being discussed is only partially filled with eggs, say, for instance, that it contains only seven eggs, the operator places her hand on the wall 83 of the selector 82 and rotates the latter in an anti-clockwise direction until the numeral N with a value of seven comes opposite the pointer 91. The detent roller 95 holds the selector 82 with the pointer 91 precisely aligned with this numeral when the hand of the operator is removed from the selector.

When the operator starts to turn the selector 82, this also turns the mandrel 71 and cam sleeve 77 which moves the dog 74 out of contact with the lug 106 causing this dog to rock into horizontal position (as shown in Fig. 6) thereby closing switch 108. This starts the motor 57 running which sets the gear train 131 in motion and causes the rotation of cam hub 118 and the successive closing of the switch 125 and actuation of the counter 50 as long as the gear train continues to move.

The shifting of the selector 82 to bring the numeral 7 opposite the pointer 91 results in the lug 106 reaching the dog 74 so as to cock this, open the switch 108 and halt the motor 57 just as the counter 50 has been actuated seven times.

As this operation occurs at the end of a run, the counter 50 is turned back to zero before this unit 41 is again actuated and the next time it is actuated will be when five more eggs have been placed in the partially packed carton in the station 26 with which this unit is associated, so as to complete the packing of that carton. This done, the operator pushes the packed carton back onto the packed carton conveyor 28, thereby momentarily opening the switch 29.

This temporarily de-energizes the solenoid 140, permitting the spring 144 to impart a one-fourteenth revolution to the ratchet wheel 138 which closes the switch 155. This causes the motor 57 to drive the gear train 131 to actuate the counter 50 until one of the cams 78 or 79 comes in contact with one of the switches 112 or 113 respectively and opens the circuit of the solenoid 139 permitting the spring 144 to impart another one-fourteenth revolution to the ratchet wheel 138, and shut off motor 57.

Owing to the fact that before the switch 29 is thus momentarily opened, the sleeve 77 had already been turned seven-twelfths of 120° away from coincidence between one of the cams 78 or 79 and one of the switches 112 or 113, another one of these cams 78 or 79 will thus come into coincidence with one of the switches 112 or 113 after the cam sleeve 77 has rotated only five-twelfths of 120°. This amount of rotation is effective in causing the actuation of the counter 50 five times before the opening of one of the switches 112 or 113, which causes the switch 155 to be opened and the motor 57 to be de-energized.

When the gear train 131 is thus halted, the selector 82 has been moved to again bring a numeral N with a value of 12 opposite the pointer 91 and the unit 41 is now set up so that with each of the subsequent momentary actuations of the switch 29, this unit will add a value of twelve to the counter 50.

The units 41 are also adapted for use in connection with packing case fillers each of which will hold three dozen eggs. When such case fillers are used, the switches 90 of the units 41 are swung over to 36 which, as may be seen in Fig. 8, means the closing of these switches, thereby cutting out the switch 113 from playing any part in stopping the motor 57.

With the switch 90 thus closed, the counter 50 will be actuated thirty-six times each time the switch 29 is momentarily opened and the selector 82 may be manually operated to indicate any whole number of eggs less than thirty-six and the unit 41 will proceed to actuate the counter 50 a number of times equal to the number of eggs thus designated by the selector 82.

In a like manner, after this has been done and the switch 29 is again opened momentarily as by the discharge of the completely packed case filler, the counter 50 will be actuated a number of times which represents the difference between thirty-six and the number less than thirty-six previously indicated by the counter 91 in order to add to the counter 50 a number equal to the eggs contained in a partially packed case filler.

The term "normal cycle" may be used to refer to a cycle of operation of a totalizer 41 which is started by actuation of the switch 29 for the purpose of counting all the eggs in a full carton. Such a cycle will necessarily start with the selector or finger dial 82 positioned with one of its numerals 12 opposite the pointer 91 as shown in Fig. 8, and if the standard number being used is 12, either the switch 112 or 113 would have to be open at the start of the cycle. If the standard number being used is 36, the switch 90 would have to be closed and the switch 112 open at the start of the cycle in order for the latter to come under the term "normal cycle" as herein defined.

For convenience, the cycle of operation of the totalizer 41 effected by manipulation of the selector 82 to count the eggs in a partially filled carton may be referred to as a "selective cycle."

The counting cycle which takes place upon the switch 29 being next opened following a selective cycle and in which the number of eggs required to completely fill the partially filled carton is counted, may be referred to as a "remainder cycle" as it effects the actuation of the counter a number of times equal to the remainder produced by subtracting the number of actuations produced in the selective cycle from the standard number being used at that time.

I claim:

1. In a totalizer for totalizing eggs as they are being packed so as to count all of the individual eggs in a given grade packed in a given lot, the combination of: a counter for counting said eggs; means responsive to a single actuation thereof by the movement of a packed carton away from its packing location to actuate said counter a number of times equal to once for each of the eggs in said packed carton; means selectively operable at the end of said lot to indicate the number of eggs in a carton only partially filled from said lot; and means responsive to the aforesaid selective operation of said means to effect the actuation of said counter a number of times equal to the number of eggs in said partially filled carton, said carton responsive means being responsive to the next subsequent actuation thereof by a carton to cause said counter to be actuated a number of times equal to the number of additional eggs necessary to fill said partially packed carton.

2. In a totalizer, the combination of: a counter; electromagnetic means for actuating said counter; a counter switch controlling said means; electromotive means adapted, when set in motion, to successively actuate said switch to cause said counter to be actuated a corresponding number of times; primary start means for setting said electromotive means in motion; primary stop means actuated by said electromotive means for automatically stopping said electromotive means after said counter has been actuated a standard number of times; and secondary start-stop means selectively operable to indicate a selected number which is less than the aforesaid standard number, and for setting said electromotive means in motion, said start-stop means halting said electromotive means when said counter has been actuated said lesser number of times, said primary stop means automatically functioning after the next subsequent starting of said electromotive means by said primary start means, to halt said electromotive means when said counter has been actuated a number of times which when added to said lesser number equals said standard number.

3. In a totalizer for totalizing eggs as they are being packed, so as to count all of the individual eggs in a given grade packed from a given lot, the combination of: a counter for counting said eggs; primary means responsive to a single actuation thereof by the movement of a completely filled carton away from its packing location to actuate said counter a number of times equal to once for each of the eggs in said packed carton and then automatically stop itself; and secondary means selectively operable at the end of said lot to indicate the number of eggs in a carton only partially filled from said lot and to set said primary means in motion to actuate said counter said indicated number of times, said secondary means including means to then automatically halt said primary means, said primary means when next set in motion by a packed carton, as aforesaid, actuating said counter a number of times equal to the number of additional eggs required to fill said partially filled carton, and then automatically stopping itself.

4. In combination: a counter; a counter actuating device adapted to repeatedly actuate said counter; a standard control, adapted, when actuated to set said device in operation and, in a normal cycle, and after said device has actuated said counter a standard number of times, to automatically halt said device; an auxiliary control associated with said standard control and adapted to be actuated selectively to indicate any desired whole number less than said standard number, said auxiliary control, when so actuated, setting said device in motion to actuate said counter said lesser number of times, and then automatically halting said device, said auxiliary control thereby modifying the status of said standard control whereby when the latter is next again actuated it will set said device in operation and automatically halt said device when the latter has actuated said counter a number of times equal to the difference between said standard number and said lesser number.

5. In combination: a counter; a power driven device adapted to repeatedly actuate said counter; primary control means adapted, when actuated, to start said device, to keep said device running after the latter has been started and, in a normal cycle, to halt said device when it has actuated said counter a standard number of times; and a secondary control means adapted to be selectively actuated to start said device, to keep the latter running to actuate said counter a selected lesser number of times than said standard number, and to then halt said device, said primary control means being operative, when next again actuated, to cause said device to actuate said counter a number of times which, when added to said lesser number, equals said standard number, and then to halt said device.

6. In combination: a counter; a power driven device adapted to repeatedly actuate said counter; primary starting means to start said device to cause the latter to repeatedly actuate said counter; primary stop means responsive, in a normal cycle, to said device completing the actuation of said counter for a standard number of times, to stop said device; and secondary start-stop means operable to start said device and indicate a selected whole number which is less than said standard number, said secondary start-stop means being responsive to said device completing the actuation of said counter said lesser number of times, to stop said device, said primary stop means then being responsive to said device, upon the latter being started by actuating said primary starting means, to halt said device when the latter has actuated said counter a number of times which, added to said lesser number, equals said standard number.

7. In a totalizer, the combination of: a counter; a rotary counter actuator; power means for rotating said actuator; primary control means, the manual operation of which starts said power means to rotate said actuator and, in a normal cycle, automatically stops said rotation after the latter has caused said actuator to actuate said counter a standard number of times; secondary control means including a rotor; a lug connected with said actuator and rotating in a fixed relation therewith for engaging and rotating said rotor when said actuator rotates but permitting said rotor to be manually rotated to an advanced position in which said rotor is out of engagement with said lug, said secondary control means being responsive to said rotor being thus rotated out of engagement with said lug to start rotation of said actuator, said secondary control means then automatically stopping said rotation when said lug re-engages said rotor; and an indicator operable by said manual rotation of said rotor to indicate the number of times said counter will be actuated by the rotation of said actuator to again bring said lug into engagement with said rotor, said rotor being thus operable manually to cause the actuation of said counter a lesser number of times than said standard number, the next subsequent manual actuation of said primary control means effecting the rotation of said actuator through a sufficient angle to actuate said counter a number of times which, added to said lesser number, equals said standard number.

8. In a totalizer, the combination of: a counter; a rotary counter actuator; power means for rotating said actuator; electric primary control means, including a manually operable start switch, the actuation of which starts said power means to rotating said actuator, and also including a stop switch which is responsive to the rotation of said actuator, in a normal cycle, to automatically stop the rotation of said actuator, this stopping occurring after said rotation has caused said actuator to actuate said counter a standard number of times; electric secondary control means including a rotor, a start-stop switch associated therewith, and a device on said rotor for actuating said start-stop switch; a lug connected with said actuator and rotating in a fixed relation therewith for engaging said device so as to open said start-stop switch and rotate said rotor when said actuator rotates but permitting said rotor to be manually rotated to an advanced position in which said rotor device moves away from engagement with said lug, said device responding to said breaking of the engagement of said lug therewith to close said start-stop switch to start rotation of said actuator, said device being responsive to the re-engagement of said lug therewith to automatically open said start-stop switch and stop said rotation; and an indicator operable by said manual rotation of said rotor to indicate the number of times said counter will be actuated by the rotation of said actuator to again bring said lug into engagement with said switch operating device, said rotor being thus operable manually to cause the actuation of said counter a lesser number of times than said standard number, the next subsequent manual actuation of said start switch of said primary control means to effect the rotation of said actuator being followed by actuation by said actuator of said stop switch to stop rotation of said actuator when the latter has rotated through a sufficient angle to actuate said counter a number of times which, added to said lesser number, equals said standard number.

9. A combination as in claim 7 including a rotary finger dial which is connected to said rotor for selectively rotating the latter to bring about the actuation of said counter a selected number of times which is less than said standard number.

10. A combination as in claim 7 including a rotary finger dial which is connected to said rotor for selectively rotating the latter to bring about the actuation of said counter a selected number of times which is less than said standard number, said dial being provided with peripheral notches; numerals disposed opposite said notches; and a spring pressed detent which bears against the periphery of said dial and extends successively into said notches to detain said rotor and said dial when said power means ceases to drive the same, with said detent reposing in a particular one of said notches thereby insuring that each rotation of said dial is through an angle representing a precise multiple of the angle between centers of adjacent notches.

11. A combination as in claim 4 in which said standard control includes means for automatically halting the counter actuating device in a normal cycle after the latter has actuated the counter a number of times equal to either of two standard numbers; and manual means for optionally determining which of said two standard numbers of times the actuating device will actuate said counter, after being started in a normal cycle, before said standard control will automatically halt said device.

12. A combination as in claim 7 including a rotary finger dial which is connected to said rotor for selectively rotating the latter, the periphery of said dial being provided uniformly thereabout with finger notches equal in number to said standard number; and numerals disposed opposite said notches to assist in fingering said notches for selectively rotating said dial and said rotor to bring about the actuation of said counter a selected number of times which is less than said standard number; and a detent for holding said dial in the position to which it has been thus turned.

13. A combination as in claim 7 including a rotary finger dial which is connected to said rotor for selectively rotating the latter, the periphery of said dial being provided uniformly thereabout with notches equal in number to a multiple of said standard number; numerals disposed opposite said notches and numbering the latter serially within each group of a series of groups, the number of notches in each of which groups is equal to said standard number; and a yieldable detent extending successively into said notches, each rotational movement of said dial beginning and ending with said detent means uniformly positioned within one of said notches.

14. A combination as in claim 7 including a rotary finger dial which is connected to said rotor for selectively rotating the latter, the periphery of said dial being provided with notches equal in number to a multiple of said standard number; numerals disposed opposite said notches and numbering the latter serially within each group of a series of groups, the number of notches in each of which groups is equal to said standard number; a yieldable detent extending successively into said notches, each rotational movement of said dial beginning and ending with said detent uniformly positioned within one of said notches; and optionally operable means for modifying said primary control means to cause the latter to automatically stop the rotation of the counter actuator, after the latter has been started in a normal cycle, only when said counter has been actuated during that cycle a number of times equal to the entire number of said notches on said dial, said latter number thereupon taking the place of the aforesaid standard number in the operation of said totalizer.

HAROLD J. MUMMA.

REFERENCES CITED

The following references are of record in the file of this patent:

UNITED STATES PATENTS

| Number | Name | Date |
| --- | --- | --- |
| 2,056,689 | Reher | Oct. 6, 1936 |
| 2,122,710 | Bidwell et al. | July 5, 1938 |
| 2,321,529 | Slinn | June 8, 1943 |